(12) United States Patent
Gardner

(10) Patent No.: US 12,018,238 B1
(45) Date of Patent: Jun. 25, 2024

(54) BEVERAGES COMPOSED OF FRUIT AND/OR VEGETABLE COMPONENTS AND METHODS FOR PRODUCING THE SAME

(71) Applicant: Susanne Gardner, Atlanta, GA (US)

(72) Inventor: Susanne Gardner, Atlanta, GA (US)

( * ) Notice: Subject to any disclaimer, the term of this patent is extended or adjusted under 35 U.S.C. 154(b) by 0 days.

(21) Appl. No.: 14/053,048

(22) Filed: Oct. 14, 2013

Related U.S. Application Data

(60) Provisional application No. 61/712,848, filed on Oct. 12, 2012.

(51) Int. Cl.
| | | |
|---|---|---|
| C12G 1/00 | (2019.01) | |
| A23C 9/156 | (2006.01) | |
| A23F 3/40 | (2006.01) | |
| A23L 2/02 | (2006.01) | |
| C12G 3/06 | (2006.01) | |

(52) U.S. Cl.
CPC ............... *C12G 1/00* (2013.01); *A23C 9/156* (2013.01); *A23F 3/405* (2013.01); *A23L 2/02* (2013.01); *C12G 3/06* (2013.01)

(58) Field of Classification Search
CPC . A23L 33/105; A23L 2/38; A23L 2/52; A23L 2/56; A23L 2/60; A23L 33/10; A23L 33/15
USPC .................................................. 426/590, 592
See application file for complete search history.

(56) References Cited

U.S. PATENT DOCUMENTS

| | | | | |
|---|---|---|---|---|
| 1,717,685 | A * | 6/1929 | Heuser ...................... | C12G 3/04 426/14 |
| 4,497,842 | A * | 2/1985 | Ehrlich ..................... | A23F 3/34 426/429 |
| 4,534,991 | A | 8/1985 | Kryger | |
| 4,626,437 | A * | 12/1986 | Schobinger .............. | C12G 3/08 426/387 |
| 4,643,083 | A | 2/1987 | Boucher | |
| 4,812,232 | A * | 3/1989 | Weiss ........................ | C12H 3/04 210/181 |
| H621 | H * | 4/1989 | Day .............................. | 426/592 |
| 4,888,189 | A * | 12/1989 | Gnekow ................... | C12H 3/04 426/231 |
| 4,946,701 | A | 8/1990 | Tsai et al. | |
| 4,978,547 | A | 12/1990 | Petershans | |
| 5,437,880 | A | 8/1995 | Takaichi et al. | |
| 5,897,904 | A * | 4/1999 | Friedman ................. | C12H 6/00 426/494 |
| 6,099,854 | A | 8/2000 | Howard et al. | |
| 7,229,658 | B1 | 7/2007 | Inoue et al. | |
| 2004/0091589 | A1 * | 5/2004 | Roy .......................... | A23L 5/47 426/265 |
| 2004/0166179 | A1 | 8/2004 | Anzaghi et al. | |
| 2005/0002992 | A1 | 1/2005 | Mccleary et al. | |
| 2008/0221003 | A1 * | 9/2008 | Meine ................. | C11D 11/0088 510/103 |
| 2009/0087526 | A1 * | 4/2009 | Taniguchi ................. | A23L 2/52 426/311 |
| 2009/0196951 | A1 * | 8/2009 | Brandborg ............... | C12G 3/06 426/2 |
| 2009/0297681 | A1 | 12/2009 | Wilkes et al. | |
| 2009/0311381 | A1 | 12/2009 | Gardner | |
| 2010/0119667 | A1 * | 5/2010 | Livaich ..................... | C12G 3/06 426/131 |
| 2011/0028426 | A1 * | 2/2011 | Trudsoe .............. | C08B 37/0045 514/54 |
| 2012/0164300 | A1 * | 6/2012 | Niazi ...................... | C12H 1/063 426/592 |

FOREIGN PATENT DOCUMENTS

| | | | | |
|---|---|---|---|---|
| FR | 2767533 | | 2/1999 | |
| GB | 190022592 | A * | 4/1901 | |
| GB | 2166335 | A * | 5/1986 | ............... C12G 3/06 |
| JP | 2005143377 | | 6/2005 | |
| WO | WO 03074648 | A1 * | 9/2003 | ............... C12G 3/06 |
| WO | WO 2006109200 | A2 * | 10/2006 | |
| WO | 2007048471 | | 5/2007 | |
| WO | 2009032323 | | 3/2009 | |

OTHER PUBLICATIONS http://members.echocommunity.org/resource/resmgr/a_to_z/azch2pt3. htm, pp. 1-5, 1987.*
The web article "Jail House Hooch" by Nick Plumber (2016), Drunkard Magazine, https://web.archive.org/web/20160224213135/ https://drunkard.com/11-03-jailhouse-3/ pp. 1-8 (Year: 2016).*
The Composition of Commercial Fruit Extracts Walter S. Long, Transactions of the Kansas Academy of Science (1903—) vol. 28 (Jan. 14, 1916-Jan. 13, 1917), pp. 157-161 (5 pages).*
"Jail house hooch" recipe by Nick Plumber, Jan. 2016, 7 pages, https://drunkard.com/11-03-jailhouse-3/.*
Herbst (Mulled Wine, from www.cookstr.com, published on Dec. 16, 2008) https://www.cookstr.com/recipes/mulled-wine (Year: 2008).*
YoBrew (Mulled Wine, from www.yobrew.co.uk/, published on Jul. 3, 2008) https://www.yobrew.co.uk/mulled.php (Year: 2008).*
"Red wine and resveratrol: Good for your heart?" MayoClinic.org. (dated Mar. 4, 2011). https://www.mayoclinic.org/diseases-conditions/ heart-disease/in-depth/red-wine/art-20048281 (Year: 2011).*

(Continued)

*Primary Examiner* — Vera Stulii

(74) *Attorney, Agent, or Firm* — Thomas | Horstemeyer, LLP

(57) ABSTRACT

Described herein are beverages composed of components derived from fruits and/or vegetables by way of percolation and/or maceration with alcoholic beverages. The inventive beverages include additional additives such as one or more sweeteners, glycerol, sugar alcohols, herbs, spices, vitamins, antioxidants, flavoring agents, acids, or any combination thereof. The methods described herein maximize the isolation of bioactive nutrients present in fruits and vegetables and form unique complexes with chemosensory flavor elements. Also disclosed herein are fruit and vegetable composites by way of percolation and/or maceration of the fruit or vegetable with alcoholic beverages, wherein the composites can be used to supplement a beverage.

21 Claims, No Drawings

(56) References Cited

OTHER PUBLICATIONS

Spiced Wine by Mary Cadogan https://www.bbcgoodfood.com/recipes/spiced-wine (Year: 2010).*
European Search Report for application No. PCT/US2009/046892 dated Jul. 29, 2011.
International Search Report and Written Opinion for application No. PCT/US09/46892 dated Aug. 27, 2009.
Vinson, "Red wine, dealcoholized red wine, and especially grape juice, inhibit atherosclerosis in a hamster model", Atherosclerosis, 156, 2001, 67-72.

* cited by examiner

BEVERAGES COMPOSED OF FRUIT AND/OR VEGETABLE COMPONENTS AND METHODS FOR PRODUCING THE SAME

CROSS REFERENCE TO RELATED APPLICATIONS

This application claims priority upon U.S. provisional application Ser. No. 61/712,848, filed Oct. 12, 2012. This application is hereby incorporated by reference in its entirety.

SUMMARY

Described herein are beverages composed of components derived from fruits and/or vegetables by way of percolation and/or maceration with alcoholic beverages containing chemical moieties of various flavors. The beverages include additional additives such as one or more sweeteners, glycerol, sugar alcohols, herbs, spices, vitamins, antioxidants, flavoring agents, acids, or any combination thereof. The methods described herein maximize the isolation of bioactive nutrients present in fruits and vegetables. The methods described herein foster the molecular bonding between alcoholic flavor chemical moieties, bioactive nutrients present in fruits and vegetables, and chemical moieties in additives described below such as spices, herbs and vitamins. Also disclosed herein are fruit and vegetable composites by way of percolation and/or maceration of the fruit or vegetable with alcoholic beverages, wherein the composites can be used to supplement a beverage.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compositions and methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "an additive" includes mixtures of two or more such components, and the like.

"Optional" or "optionally" means that the subsequently described event or circumstance can or cannot occur, and that the description includes instances where the event or circumstance occurs and instances where it does not.

Described herein are beverages composed of components derived from fruits and/or vegetables by way of percolation and/or maceration with alcoholic beverages. The methods described herein are efficient in isolating nutrients present in fruits and vegetables that provide health benefits and in forming chemical complexes between unique flavor entities and bionutrients.

In one aspect, the beverage is produced by
(a) percolating or macerating the fruit or vegetable with an alcoholic beverage, wherein the fruit and vegetable or any portion thereof is not heated prior to percolation or maceration, to produce a liquid component and a solid component;
(b) separating the liquid component from the solid component; and
(c) adding one or more sweeteners, glycerol, sugar alcohols, herbs, spices, vitamins, antioxidants, flavoring agents, acids, or any combination thereof (i) before step (a); (ii) during step (a); (iii) to the liquid component after step (b), or any combination thereof, to produce the beverage.

Details regarding the steps and materials used to produce the beverages described herein are provided below.

The first step involves the selection of the appropriate fruit and or vegetable to be used. The selection can vary depending upon the final beverage to be produced.

In one aspect, the fruits can be of the classification of: berries such as, but not limited, to raspberries, blackberries; pomes such as apples or pears; drupes such as cherries or plums. These include, but are not limited to, the classifications of genus *Apteryx, Citrus, Fragaria, Malus, Mangifera, Morus, Prunus, Pyrus, Rubus, Vaccinium*, or any combination thereof.

In another aspect, the vegetable can include, but is not limited to, the classification of *allum, crucifer*, leafy green, legume or root. These include, but are not limited to, the classifications of genus *Apium, Beta, Brassica, Capsicum, Cucumis, Daucus, Piper* and *Spinacia*, or any combination thereof.

Prior to maceration or percolation, the fruit or vegetable can be processed. For example, the fruit or vegetable can be washed using techniques known in the art. Depending upon the selection of the fruit or vegetable, the entire fruit can be used or portions thereof can be removed and subsequently macerated or percolated. In one aspect, if the fruit or vegetable has seeds or pits, they can be removed prior to maceration or percolation. Finally, depending upon the selection of the fruit or vegetable, the fruit or vegetable can be ground up prior to maceration or percolation.

The fruit or vegetable is not dried or roasted prior to maceration or percolation. For example, the fruit or vegetable is not heated at temperatures greater than 100° C. in order to remove most if not all of the water present in the fruit or vegetable. Not wishing to be bound by theory, the roasting of the fruit or vegetable at temperatures greater than 100° C. would destroy many of the valuable bioactive components present in the fruit or beverage of the present invention. Thus, the methods described herein maximize the amount of isolated bioactive components present in the fruit or vegetable and confer a unique taste according to the methods described.

After the fruits or vegetables have been selected and, if necessary, processed, the fruits or vegetables are percolated or macerated with an alcoholic beverage. Not wishing to be bound by theory, percolation and maceration with the alcoholic beverage breaks down and/or complexes with the relatively more "lipophilic," more alcohol-soluble, or hydrophobic constituents of the fruit or vegetable while at the same time forming chemical complexes that confer unique chemosensory aspects and taste; the aqueous phase breaks down and/or forms complexes, with the more "hydrophilic" or water-soluble constituents present in the fruit and vegetable.

The maceration and percolation steps are performed in the presence of alcoholic beverages and/or additives that provide both the alcoholic phase and the molecular complexes conferring unique taste and chemosensory aspects. Molecular interactions and bonding between bionutrients and flavor moieties are facilitated to produce a unique taste. The molecular interactions include, but are not limited to covalent bonding, ionic bonding, hydrogen bonding, chelate complexes, Lewis acid/base interactions, and the like. The term "alcoholic beverage" is defined herein as any beverage suitable for human consumption that contains ethanol. The amount of ethanol can vary. For example, when the alcoholic beverage is a distilled spirit, it can be from 70 to 120 proof. Examples of distilled spirit useful herein include, but are not limited to, rum, vodka, whiskey, bourbon, gin, brandy, and the like. In other aspects, the alcoholic beverage can be wine. Here the wine can white wine, rose, or red wine. In another aspect, the alcoholic beverage is wine and a distilled spirit.

The amount of alcoholic beverage relative to the fruit or vegetable can vary depending upon the selection of starting materials. In certain aspects, during the maceration and percolations steps, heat, steam, vacuum, and/or pressure can be applied in order to expedite the process and facilitate molecular interaction between bioactive components from the fruit or vegetable and flavor moieties present in the alcoholic beverage. In the case of maceration, the mixture can be agitated by stirring or other means in order to intimately mix the alcoholic beverage with the fruit and/or vegetable. In one aspect, the mixture of fruit and/or vegetable is heated up to 100° C. In another aspect, the mixture of fruit and/or vegetable is heated from 50° C. to 100° C., 60° C. to 100° C., 70° C. to 100° C., or 80° C. to 100° C.

In certain aspects, the fruit or vegetable can be macerated or percolated with water in addition to the alcoholic beverage. For example, an aqueous mixture of alcoholic beverage (e.g., alcoholic beverage further diluted with water) can be prepared and used in the maceration or percolation step. In another aspect, the fruit or vegetable is first macerated or percolated with the alcoholic beverage then water. Here, the liquid component produced with the alcoholic beverage is removed, with the resulting solid component macerated or percolated with water. Alternatively, the fruit or vegetable is first macerated or percolated with water then the alcoholic beverage in a similar manner. The maceration or percolation step can be a continuous process (i.e., the fruit or vegetable is in continuous contact with a stream of alcoholic beverage) or batch process.

In other aspects, additional organic solvents can be used in the percolations or maceration step. For example, 100% ethanol can be used in conjunction with the alcoholic beverage. Here, the ethanol can be used to remove additional components from the fruits and vegetables as needed. However, the use of 100% ethanol is separate and independent from the alcoholic beverage used in the methods described herein.

After the maceration or percolation step, a liquid component composed of the bioactive components from the fruit and/or vegetable and a solid component are produced. The liquid component can be separated from the solid component by techniques including, but not limited to, pressing, straining, filtering, or by centrifuge.

Not wishing to be bound by theory, the natural elements of the alcoholic beverage remove beneficial components present in the fruit or vegetable that are less water-soluble than they are alcohol-soluble. These beneficial elements differ in nature than those derived from only fruit or vegetable juices, both in nutritional value and in taste. Maceration or percolation with an alcoholic beverage results in bioactive complexes and chemosensory and taste complexes that distinguish them from the components present in fruit or vegetable juices.

The liquid component produced above can be further processed in order to modify the properties of the final beverage product. In one aspect, the liquid component can be heated (e.g., boiled, distilled, etc.) for a sufficient time to remove some or all of the ethanol present in the liquid component. Thus, the beverage can be an alcoholic or non-alcoholic beverage (e.g, 0.5% or less ethanol).

In another aspect, one or more additives can be added to the liquid component to produce the final beverage. For example, additives including colorants, sweeteners, glycerol, sugar alcohols, herbs, spices, additional antioxidants, flavoring agents, acids, or vitamins can be added to the liquid component. In alternate embodiment, the one or more of the optional additives listed above can be added during the maceration or percolation step (i.e, after the mixing of the fruit or vegetable with the alcoholic beverage). In another aspect, one or more additives above can be mixed with the alcoholic beverage prior to maceration or percolation.

In one aspect, the optional sweetener includes natural sweeteners. Natural sweeteners include, for example, sugar cane, sugar, molasses, sucrose, glucose, dextrose, fructose, maltose, saccharin, stevia, or any combination thereof.

In another aspect, the optional sugar alcohols include, but are not limited to, sorbitol, mannitol, or a combination thereof.

In yet another aspect, the optional herbs include, but are not limited to, astragalus, basil, bilberry, capsicum, chervil, coriander, dill, fennel, gingko biloba, green tea, marjoram, mint, oregano, rosemary, sage, tarragon, and thyme, or any combination thereof.

In a further aspect, the optional spices include, but are not limited to, allspice, anise, caraway, cardamon, cinnamon, cloves, cumin, ginger, marjoram, nutmeg, pepper, sage, tarragon, thyme, and turmeric, or any combination thereof.

In a further aspect, the optional flavorings include but are not limited to almond, amaretto, butterscotch, caramel, peppers, salt, and vanilla, or any combination thereof.

In one aspect, the optional vitamins include, but are not limited to, vitamin A, B vitamins (such as $B_1$, $B_6$, and $B_{12}$) vitamin C, vitamin D, vitamin E, or any combination thereof.

In yet another aspect, the optional antioxidants include glutathione, lipoic acid, carotenoids, uric acid, ubiquinol, flavanoids, polyphenols, polyphenolic antioxidants such as resveratrol and resveratrol extracts, or any combination thereof.

In one aspect, the optional acid can be tartaric, malic, lactic, and succinic acids.

In another aspect, a polyphenol can be added to the final beverage. For example, resveratrol can be provided as an extract.

In certain aspects, the beverages described herein contain no synthetic ingredients. For example, in one aspect, the beverages do not contain preservatives, non-naturally occurring preservatives, or any added preservatives. In other aspects, the beverages do not include pharmaceutical drugs that are considered legend drugs.

In another aspect, the beverages produced herein can be carbonated to produce a carbonated beverage. Techniques for carbonating beverages can be used herein.

In another aspect, liquid component produced by the methods described herein can be used as a fruit or vegetable composite. In this aspect, the composite can be added directly to a beverage of choice. For example, the composite can be added to tea, fruit juice, vegetable juice, milk, water, a carbonated beverage, or an alcoholic beverage.

The beverages produced herein have a unique taste combined with the beneficial nutritional components derived from the fruits or vegetables that can only be derived from the complete process as described above. Moreover, when additional additives are used during the percolation or maceration process, retained in the mixture are the benefits from molecular interactions between the additives during the percolation or maceration process.

The objectives and advantages of these processes involve both nutrient content and taste of the final beverage, via interaction of nutritional and taste elements from processing as described in the methodology above. Many elements present in fruits or vegetables that are beneficial to health are more alcohol-soluble than they are water soluble, and so are also included in the final beverage in a unique way, along with the unique resulting flavor. The taste of fruit or vegetable maceration or percolation with an alcoholic beverage that includes taste moieties, no matter what the alcohol content, produces a unique taste complex that is not duplicated by the simple addition of "juice". Additionally, fiber from the pulp may be a beneficial optional addition to the beverage derived from the percolation or maceration procedure. The methods described herein foster the simultaneous chemical interaction and capture of essential nutrients present in fruits and vegetables with varying solubility, while at the same time forming molecular complexes that confer unique taste. These complexes confer the unique taste and chemosensory quality desired in the final beverage.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A method for producing a beverage comprising
   (a) selecting a fruit or vegetable, wherein the fruit or vegetable is not heated at a temperature greater than 100° C.;
   (b) percolating, macerating, or a combination thereof the fruit or vegetable that has not been heated at a temperature greater than 100° C. with an alcoholic beverage comprising wine and a distilled spirit that is from 70 to 120 proof, wherein resveratrol extract is added to the fruit or vegetable prior to and/or during percolation, maceration, or a combination thereof with the alcoholic beverage to produce a first composition;
   (c) heating the first composition at a temperature from 50° C. to 70° C.;
   (d) adding one or more components selected from the group consisting of a sweetener, glycerol, a sugar alcohol, an herb, a spice, a vitamin, an antioxidant, a flavoring agent, an acid, and any combination thereof, wherein the one or more components are added (i) before step (b); (ii) during step (b); or any combination thereof to produce a second composition, wherein the second composition comprises alcohol; and
   (e) removing alcohol from the second composition produced after step (d) to produce a beverage with no alcohol or less than or equal to 0.5% alcohol.

2. The method of claim 1, wherein step (b) and/or step (d) is conducted under pressure.

3. The method of claim 1, wherein the distilled spirit comprises rum, vodka, whiskey, bourbon, gin, or brandy.

4. The method of claim 1, wherein the distilled spirit is brandy.

5. The method of claim 1, further comprising percolating and macerating the fruit or vegetable with water, wherein the percolation and maceration with water is performed (i) prior to step (b); (ii) after step (b); or (iii) concurrently in step (b).

6. The method of claim 1, wherein step (d) and/or (e) is conducted at a temperature from 50° C. to less than 100° C.

7. The method of claim 1, wherein the sweetener is a natural sweetener.

8. The method of claim 7, wherein the natural sweetener is selected from the group consisting of cane sugar, molasses, sucrose, dextrose, fructose, maltose, saccharin, stevia and any combination thereof.

9. The method of claim 1, wherein the vitamin is selected from the group consisting of vitamin A, B vitamins, vitamin C, vitamin D, vitamin E, and any combination thereof.

10. The method of claim 1, wherein the antioxidant is selected from the group consisting of glutathione, lipoic acid, carotenoids, uric acid, ubiquinol, polyphenolic antioxidants, and any combination thereof.

11. The method of claim 1, wherein the acid is selected from the group consisting of tartaric acid, malic acid, lactic acid, succinic acid, and any combination thereof.

12. The method of claim 1, wherein the herb is selected from the group consisting of astragalus, basil, bilberry, capsicum, chervil, coriander, dill, fennel, gingko biloba, green tea, marjoram, mint, oregano, rosemary, sage, tarragon, thyme, and any combination thereof.

13. The method of claim 1, wherein the spice is selected from the group consisting of allspice, anise, caraway, cardamom, cinnamon, cloves, cumin, ginger, marjoram, nutmeg, pepper, sage, tarragon, thyme, turmeric, and any combination thereof.

14. The method of claim 1, wherein the flavoring is selected from the group consisting of almond, amaretto, butterscotch, caramel, peppers, salt, vanilla, and any combination thereof.

15. The method of claim 1, wherein the sugar alcohol is selected from the group consisting of sorbitol, mannitol, and a combination thereof.

16. The method of claim 1, wherein the beverage contains only naturally occurring preservatives.

17. The method of claim 1, wherein after step (d), carbonating the liquid component to produce a carbonated beverage.

18. The method of claim 1, wherein after step (a) and prior to step (b) the fruit or vegetable is ground up.

19. The method of claim 1, wherein the fruit or vegetable is the entire fruit or vegetable.

20. The method of claim 1, wherein the fruit or vegetable is a portion of the fruit or vegetable.

21. The method of claim 1, wherein the fruit comprises pears, apples, or a combination thereof.

* * * * *